(12) United States Patent
Chiu et al.

(10) Patent No.: US 7,965,332 B2
(45) Date of Patent: Jun. 21, 2011

(54) METHOD AND DEVICE FOR DYNAMICALLY DISPLAYING IMAGE BY VIRTUAL PLANE COORDINATE CONVERSION

(75) Inventors: Sheng-Yu Chiu, Zhonghe (TW);
 Ming-Hua Wan, Xindian (TW);
 Tsung-Heng Chen, Taipei (TW);
 Chi-Ming Chien, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 969 days.

(21) Appl. No.: 11/243,048

(22) Filed: Oct. 4, 2005

(65) Prior Publication Data
 US 2006/0232694 A1 Oct. 19, 2006

(30) Foreign Application Priority Data
 Apr. 13, 2005 (TW) .............................. 94111642 A (51) Int. Cl.
 *H04N 5/222* (2006.01)
(52) U.S. Cl. ................... 348/333.12; 345/672; 382/295
(58) Field of Classification Search .............. 348/36–39,
  348/207.99, 218.1, 239, 333.01, 333.03,
  348/333.05, 333.11, 333.12; 382/284; 396/322;
  345/646
 See application file for complete search history.

(56) References Cited

U.S. PATENT DOCUMENTS

| | | | | |
|---|---|---|---|---|
| 5,023,720 A * | 6/1991 | Jardins | ......................... | 348/584 |
| 5,602,985 A * | 2/1997 | Ishida | ......................... | 345/501 |
| 5,640,522 A * | 6/1997 | Warrin | ......................... | 715/732 |
| 6,677,981 B1 * | 1/2004 | Mancuso et al. | ................ | 348/36 |
| 6,879,342 B1 * | 4/2005 | Miller et al. | ............ | 348/333.05 |
| 7,136,096 B1 * | 11/2006 | Yamagishi et al. | ........ | 348/218.1 |
| 7,424,218 B2 * | 9/2008 | Baudisch et al. | ............. | 396/322 |
| 7,454,077 B1 * | 11/2008 | MacKenzie et al. | ......... | 382/250 |
| 2001/0030706 A1 * | 10/2001 | Miller et al. | ............ | 348/333.05 |
| 2002/0057386 A1 * | 5/2002 | Otera | ........................... | 348/744 |
| 2002/0126154 A1 * | 9/2002 | Watson | ...................... | 345/784 |
| 2002/0163512 A1 * | 11/2002 | Staudacher | .................. | 345/204 |
| 2003/0002750 A1 * | 1/2003 | Ejiri et al. | ..................... | 382/284 |
| 2004/0061791 A1 * | 4/2004 | Terada | ...................... | 348/231.2 |
| 2004/0189849 A1 * | 9/2004 | Hofer | ........................ | 348/333.03 |
| 2004/0257384 A1 * | 12/2004 | Park et al. | ..................... | 345/646 |
| 2005/0185055 A1 * | 8/2005 | Miller et al. | ................ | 348/207.1 |
| 2005/0190280 A1 * | 9/2005 | Haas et al. | .............. | 348/333.05 |
| 2005/0200706 A1 * | 9/2005 | Ouchi | ..................... | 348/207.99 |
| 2006/0181619 A1 * | 8/2006 | Liow et al. | .................... | 348/239 |

FOREIGN PATENT DOCUMENTS

| | | | |
|---|---|---|---|
| JP | 06324832 A | * | 11/1994 |
| TW | 463102 | | 11/2001 |
| TW | 508527 | | 11/2002 |

\* cited by examiner

*Primary Examiner* — Lin Ye
*Assistant Examiner* — Dennis Hogue
(74) *Attorney, Agent, or Firm* — Thomas|Kayden (57) ABSTRACT

Device and method capable of dynamically displaying digital images by coordinate conversion on a virtual plane are provided. The device includes a display unit, a storage unit, and a processing unit. The display unit includes a screen. The storage unit stores a digital image. The processing unit establishes a virtual plane including a display region corresponding to the screen of the display unit, projects the digital image on the virtual plane to form an image region, and decides a moving trace of the image region on the virtual plane. When the image region and the display region overlap, the processing unit calculates the overlap and displays a corresponding part of the digital image by reading from the storage unit on a corresponding part of the screen.

19 Claims, 9 Drawing Sheets

| virtual plane coordinate | memory coordinate | display coordinate | memory coordinate → display coordinate |
|---|---|---|---|
| the area on a virtual plane where the upper-left point $S_V$ of a digital image is located | the coordinates of the upper-left point $P_M$ and the lower-right point $Q_M$ of a corresponding part of the digital image in a memory | the coordinates of the upper-left point $P_D$ and the lower-right point $Q_D$ of a corresponding part of a display | the coordinate of a point $K_D$ on the display after projecting a point $K_M$ ($K_{MX}$, $K_{MY}$) in the digital image in the memory onto the display as $K_D$ |
| area a $\begin{pmatrix} 0<=S_{VX}<=640 \\ \text{and } 0<=S_{VY}<=480 \end{pmatrix}$ | $P_M=(640-S_{VX}, 480-S_{VY})$ $Q_M=(640,480)$ | $P_D=(0,0)$ $Q_D=(S_{VX},S_{VY})$ | $K_D=(K_{MX}+S_{VX}-640, K_{MY}+S_{VY}-480)$ |
| area b $\begin{pmatrix} 640<S_{VX}<=1280 \\ \text{and } 0<=S_{VY}<=480 \end{pmatrix}$ | $P_M=(0,480-S_{VY})$ $Q_M=(1280-S_{VX},480)$ | $P_D=(S_{VX}-640,0)$ $Q_D=(640,S_{VY})$ | |
| area c $\begin{pmatrix} 0<=S_{VX}<=640 \\ \text{and } 480<S_{VY}<=960 \end{pmatrix}$ | $P_M=(640-S_{VX},0)$ $Q_M=(640,960-S_{VY})$ | $P_D=(0,S_{VY}-480)$ $P_Q=(S_{VX},480)$ | |
| area d $\begin{pmatrix} 640<S_{VX}<=1280 \\ \text{and } 480<S_{VY}<=960 \end{pmatrix}$ | $P_M=(0,0)$ $Q_M=(1280-S_{VX},960-S_{VY})$ | $P_D=(S_{VX}-640,S_{VY}-480)$ $P_Q=(640,480)$ | |
| others $\begin{pmatrix} S_{VX}>1280 \\ \text{or } S_{VY}>960 \end{pmatrix}$ | none | none | |

METHOD AND DEVICE FOR DYNAMICALLY DISPLAYING IMAGE BY VIRTUAL PLANE COORDINATE CONVERSION

BACKGROUND

The invention relates to device and method capable of dynamically displaying digital images by coordinate conversion on a virtual plane, and in particular, to device and method capable of dynamically displaying digital images by coordinate conversion on a virtual plane for digital still cameras (DSC), handheld video recorders, and digital versatile disc (DVD) players.

Digital still cameras (DSC) are commonly used electronic devices for capturing digital images. Typically, a DSC includes a display that statically displays digital images captured previously for a user to view everywhere at anytime, which is convenient.

Figure 1:
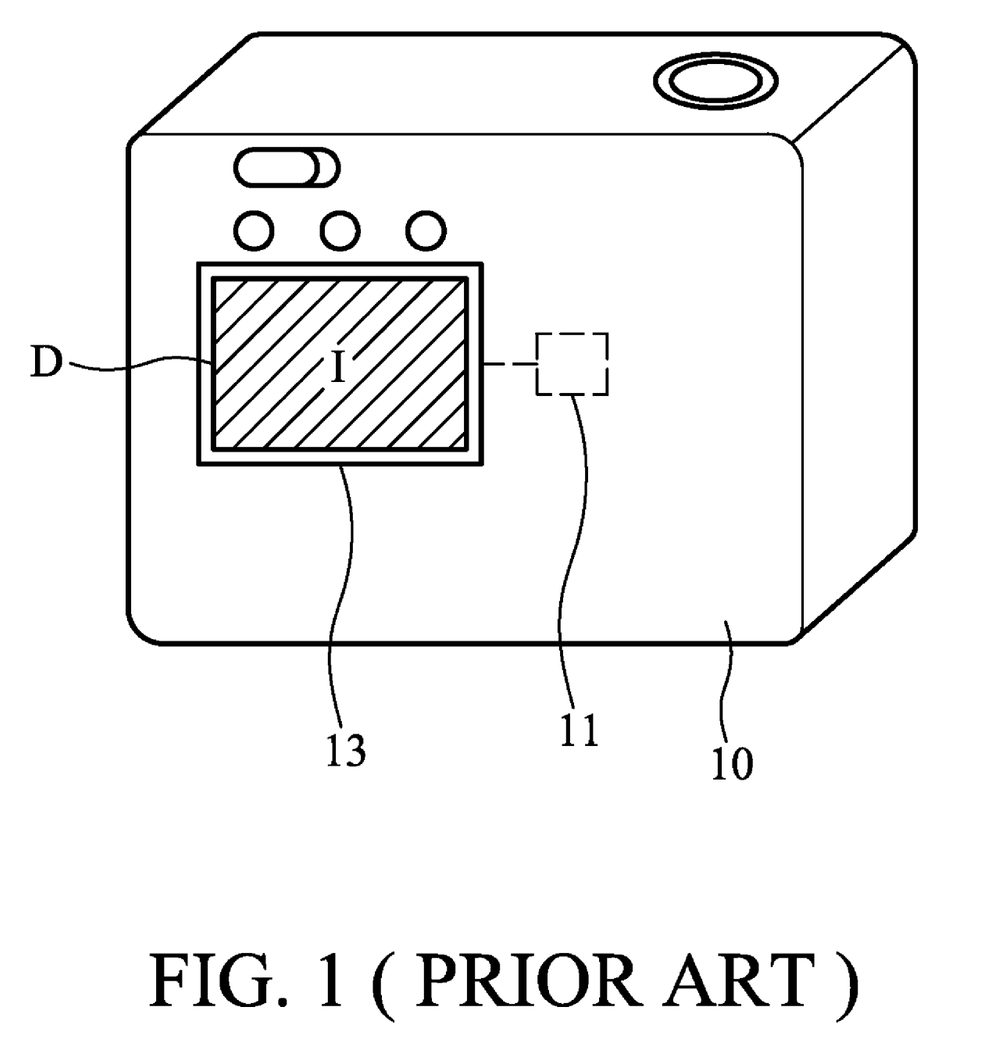
FIG. 1 is a diagram of a conventional digital still camera (DSC) 10.

FIG. 1 is a diagram of a conventional DSC 10. As shown in FIG. 1, when a user wants to view a digital image I previously captured, the digital image I is read out from a memory 11 and then statically displayed on a screen D of a display 13 for the user to view. Conventional static display of digital images can be further improved to enhance joy and friendliness in use.

SUMMARY

Device and method capable of dynamically displaying digital images by coordinate conversion on a virtual plane are provided. An exemplary embodiment of a digital versatile disc (DVD) player capable of dynamically displaying digital images by coordinate conversion on a virtual plane includes an image output interface, a storage unit, and a processing unit. The image output interface is connected to a display unit. The storage unit stores at least a digital image. The processing unit establishes a virtual plane including a display region in the center. The display region and the digital image are of the same dimension. The processing unit projects the digital image in the storage unit on the virtual plane to form an image region, decides a moving trace of the image region, on the virtual plane, determines whether the image region and the display region overlap, and, if so, outputs a corresponding part of the digital image to the image output interface.

The display unit includes a screen. The screen corresponds to the display region in a one-to-one pixel style. The display unit is connected to the image output interface. The corresponding part of the digital image is displayed on a corresponding part of the screen.

The processing unit outputs a preset background color to fill an area on the screen that does not display the corresponding part of the digital image. Alternatively, the area on the screen that does not display the corresponding part of the digital image corresponds to another digital image previously displayed.

An exemplary embodiment of a method of dynamically displaying digital images by coordinate conversion on a virtual plane, including the steps of establishing a virtual plane, selecting a display region on the virtual plane, wherein the display region is in the center of the virtual plane, and the display region corresponds to a screen of a display unit, projecting at least a digital image in a storage unit on the virtual plane to form an image region, deciding a moving trace of the image region on the virtual plane, determining whether the image region and the display region overlap, calculating the overlap between the image region and the display region, and displaying a corresponding part of the digital image on a corresponding part of the screen. The display region and the digital image are of the same dimension.

The method further includes the step of filling an area on the screen that does not display the corresponding part of the digital image with a preset background color. Alternatively, the area on the screen that does not display the corresponding part of the digital image corresponds to another digital image previously displayed.

Some embodiments of a digital still camera (DSC) capable of dynamically displaying digital images by coordinate conversion on a virtual plane include a display unit, an image capture unit, a storage unit, a processing unit. The display unit includes a screen. The image capture unit generates at least a digital image by capturing an external image. The storage unit stores the digital image. The processing unit establishes a virtual plane including a display region in the center. The display region corresponds to the screen of the display unit in a one-to-one pixel style. The display region and the digital image are of the same dimension. The processing unit projects the digital image in the storage unit on the virtual plane to form an image region, decides a moving trace of the image region on the virtual plane, determines whether the image region and the display region overlap, and, if so, displays a corresponding part of the digital image on a corresponding part of the screen.

The processing unit outputs a preset background color to fill an area on the screen that does not display the corresponding part of the digital image. Alternatively, the area on the screen that does not display the corresponding part of the digital image corresponds to another digital image previously displayed.

DESCRIPTION OF THE DRAWINGS

Device and method capable of dynamically displaying digital images by coordinate conversion on a virtual plane can be more fully understood by reading the subsequent detailed description and examples with references made to the accompanying drawings, wherein.

DETAILED DESCRIPTION

The invention will be described in greater detail in the following.

A principle aim of the invention is to dynamically display digital images on a display of a DSC by coordinate conversion on a virtual plane, thus enhancing joy and friendliness in use.

Figure 2:
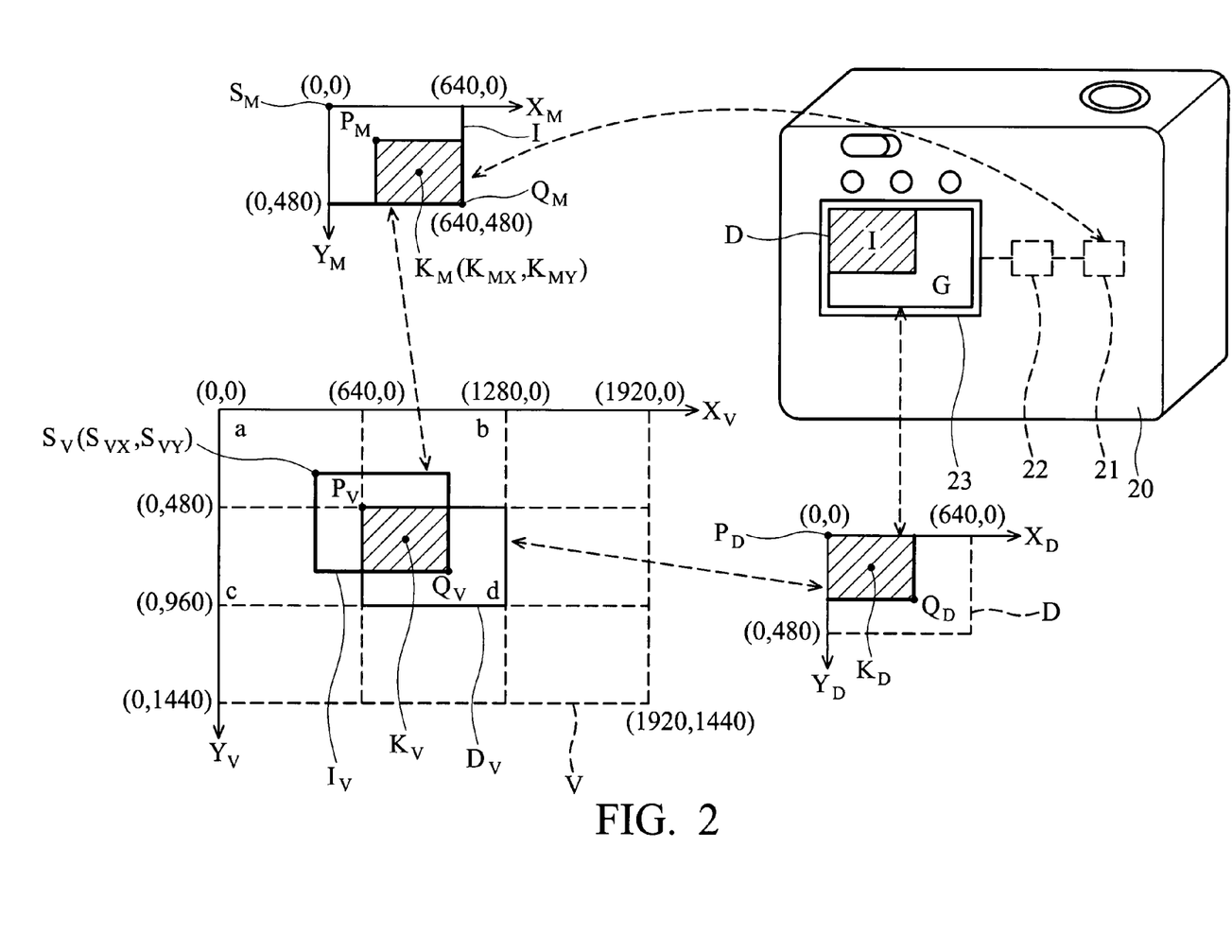
FIG. 2 is a schematic diagram of coordinate conversion of a digital image I on a virtual plane V, in a memory 21, and on a display 23 of a DSC 20.

FIG. 2 is a schematic diagram of coordinate conversion of a digital image I on a virtual plane V, in a memory 21, and on a display 23 of a digital still camera (DSC) 20. The DSC 20 is capable of dynamically displaying digital images by coordinate conversion on the virtual plane V. The DSC 20 includes a display 23, a memory 21, and a processor 22. The display 23 is a liquid crystal display (LCD). The memory 21 is a synchronous dynamic random access memory (SDRAM). The memory 21 stores the digital image I. The coordinate of the memory 21 is shown at the upper-left corner in FIG. 2. The digital image I is generated from an image capture unit of the DSC 20, such as a charge coupled device (CCD) component or a complementary metal-oxide semiconductor (CMOS) component, by capturing an external image. In some embodiments of the DSC 20, the digital image I is 640×480 pixels in dimension. Moreover, the coordinate of the display 23 is shown at the lower-right corner in FIG. 2. The display 23 is 640×480 pixels in dimension. The processor 22 establishes the virtual plane V. The coordinate of the virtual plane V is shown at the lower-left corner in FIG. 2. The virtual plane V is 1920×1440 pixels in dimension. While the invention has been described by way of example and in terms of the preferred embodiments, it is to be understood that the invention is not limited thereto. It is intended to cover various modifications and similar arrangements, for example, the dimension of the digital image I or the virtual plane V is flexible. Therefore, the scope of the appended claims should be accorded the broadest interpretation so as to encompass all such modifications and similar arrangements.

In some embodiments of the DSC 20, the virtual plane V is 9 times the digital image I in dimension. The virtual plane V includes a display region $D_V$ in the center. The display region $D_V$ and the digital image I are of the same dimension. The display region $D_V$ corresponds to a screen D of the display 23 in a one-to-one pixel style. The processor 22 projects the digital image I in the memory 21 on the virtual plane V to form an image region $I_V$, decides a moving trace of the image region $I_V$ on the virtual plane V, and determines whether the image region $I_V$ and the display region $D_V$ overlap. As indicated by oblique lines in FIG. 2, the overlap exists between the image region $I_V$ and the display region $D_V$, so the processor 22 displays a corresponding part of the digital image I by reading from the memory 21 on a corresponding part of the screen D of the display 23. Moreover, the processor 22 outputs a preset background color, such as white color, to fill a background area G on the screen D that does not display the corresponding part of the digital image I, as shown at the upper-right corner in FIG. 2.

Figure 3:
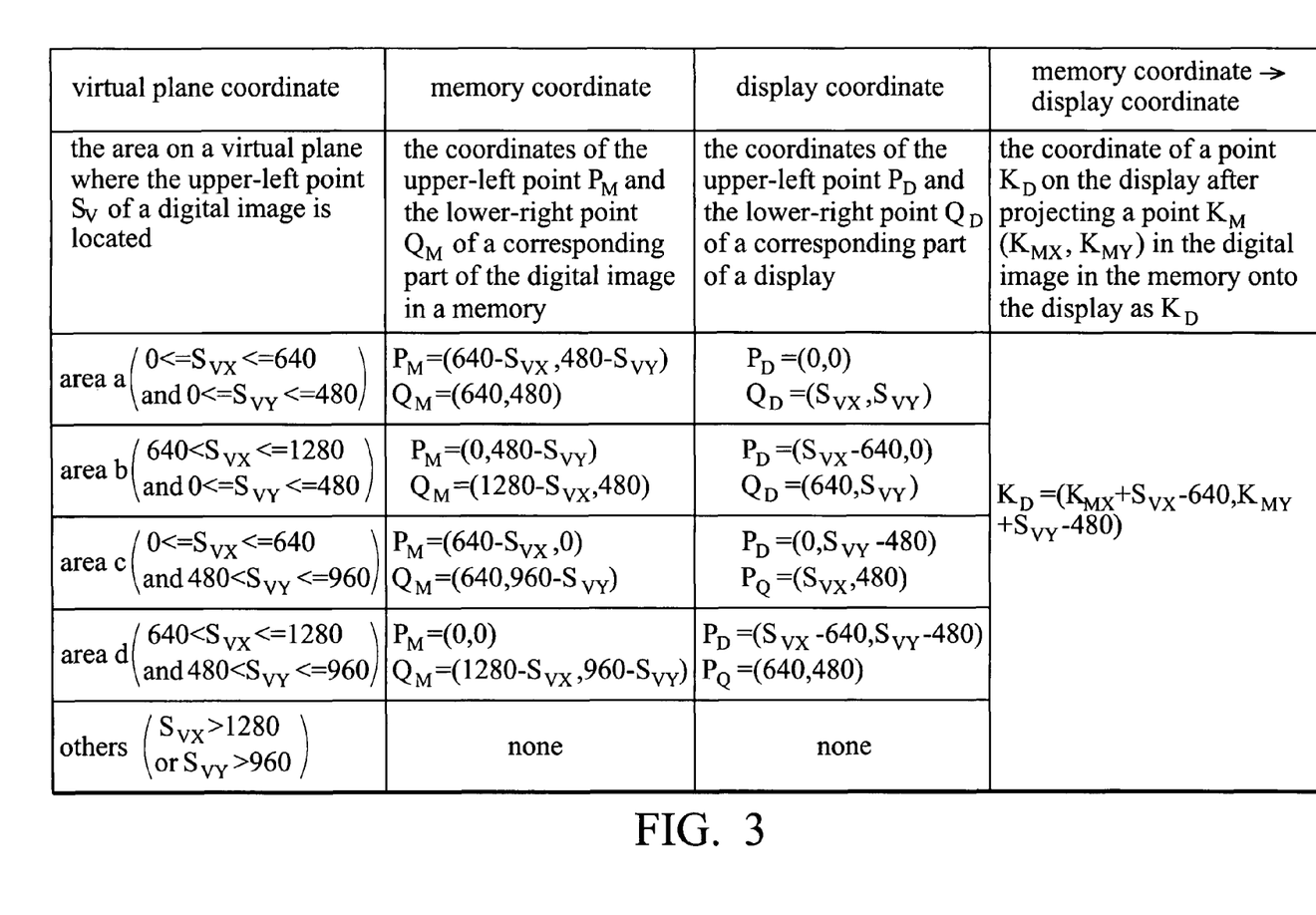
FIG. 3 is a table of coordinate conversion of the digital image I on a virtual plane V, in the memory 21, and on the display 23 of the DSC 20.

FIG. 3 is a table of coordinate conversion of the digital image I on the virtual plane V, in the memory 21, and on the display 23 of the DSC 20. Referring to FIG. 2, when executing coordinate conversion, the processor 22 divides the virtual plane V into 9 areas. The overlap between the image region $I_V$ and the display region $D_V$ exists only when the upper-left point $S_V(S_{VX}, S_{VY})$ of the image region $I_V$ is located at the areas a, b, c, or d. As indicated by oblique lines in FIG. 2, the overlap is defined by the upper-left point $P_V$ and the lower-right point $Q_V$. After the processor 22 determines the area on the virtual plane V where the upper-left point $S_V(S_{VX}, S_{VY})$ of the image region $I_V$ is located, the processor 22 calculates out the coordinate of the corresponding part of the digital image I in the memory 21, which is defined by the upper-left point $P_M$ and the lower-right point $Q_M$, using the table in FIG. 3. The processor 22 also calculates out the coordinate of the corresponding part of the screen D on the display 23, which is defined by the upper-left point $P_D$ and the lower-right point $Q_D$, using the table in FIG. 3. The processor 22 then displays the corresponding part of the digital image I, defined by the two points $P_M$ and $Q_M$, by reading from the memory 21 on the corresponding part of the screen D of the display 23, defined by the two points $P_D$ and $Q_D$. Moreover, the table in FIG. 3 also provides a formula for coordinate conversion from an arbitrary point $K_M(K_{MX}, K_{MY})$ in the corresponding part of the digital image I in the memory 21 to a corresponding point $K_D$ on the screen D of the display 23 after projecting the point $K_M$ on the screen D as the point $K_D$.

For example, suppose the coordinate of the upper-left point $S_V(S_{VX}, S_{VY})$ of the image region $I_V$ is (210,330). Because $0 \leq S_{VX} \leq 640$ and $0 \leq S_{VY} \leq 480$, the point $S_V$ is located at the area a of the virtual plane V. Calculation results using the table in FIG. 3 are as follows: $P_M=(640-210, 480-330)=(430,150)$, $Q_M=(640,480)$, $P_D=(0,0)$, and $Q_D=(210,330)$. Using these values, the processor 22 then displays the corresponding part of the digital image I, defined by the two points $P_M(430,150)$ and $Q_M(640,480)$, by reading from the memory 21 on the corresponding part of the screen D of the display 23, defined by the two points $P_D(0,0)$ and $Q_D(210,330)$.

Similarly, after the image region $I_V$ moves to another location on the virtual plane V, the processor 22 re-determines the area on the virtual plane V where the upper-left point $S_V(S_{VX}, S_{VY})$ of the image region $I_V$ is currently located. Using the table in FIG. 3, the processor 22 displays the updated overlap on the screen D of the display 23. Specifically speaking, when the image region $I_V$ moves on the virtual plane V along a moving trace, the processor 22 refreshes the overlap on the screen D of the display 23 periodically, such as at the frequency of 30 frames per second (30 frame/sec), according to the current upper-left point $S_V$ of the image region $I_V$, thus achieving the effect of dynamically displaying the digital image I on the screen D. Moreover, the moving trace is decided by the processor 22, which can be in any style, for example, from up to down, from left to right, rotational, irregular, or others.

Figure 4A:
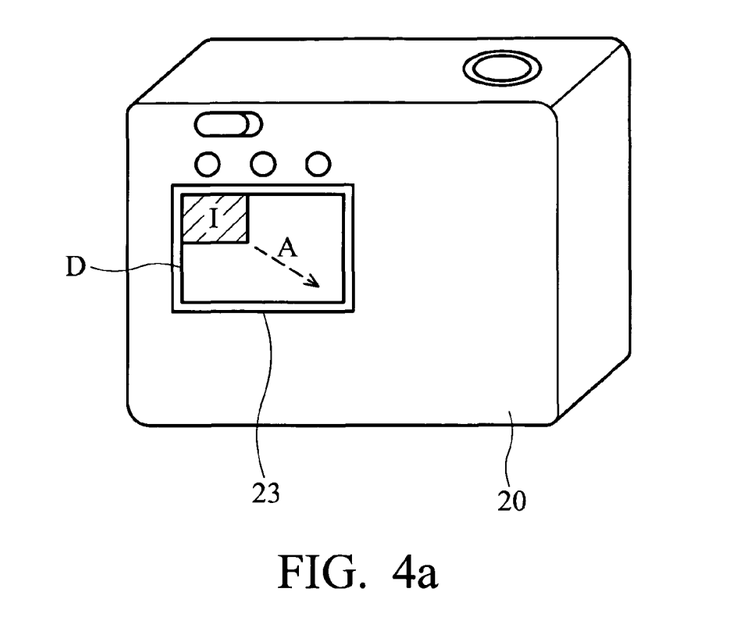
FIG. 4a is a diagram of an embodiment of the DSC 20, wherein the digital image I is at the upper-left corner of the display 23.
Figure 4B:
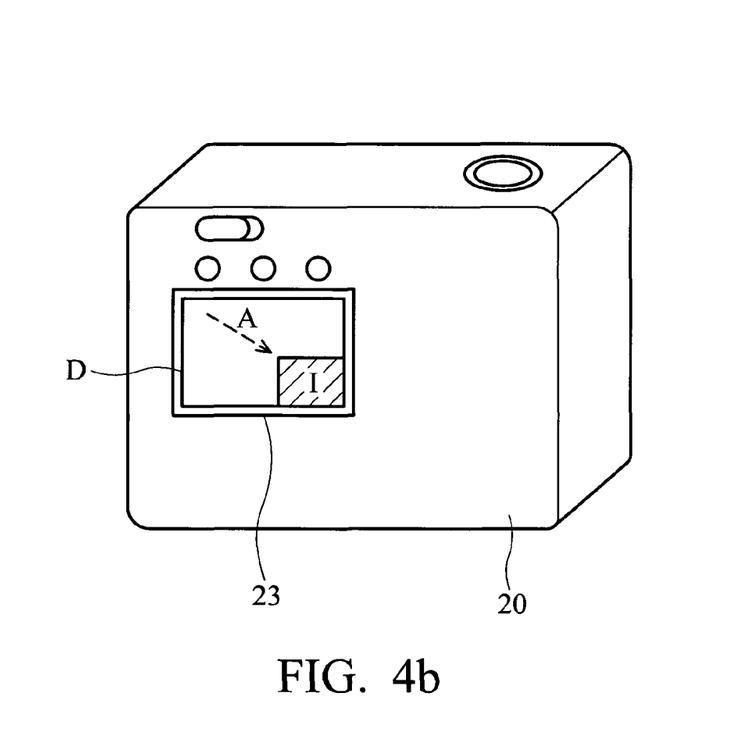
FIG. 4b is a diagram of an embodiment of the DSC 20, wherein the digital image I is at the lower-right corner of the display 23 after the digital image I moves from the upper-left corner to the lower-right corner along the direction A.

FIG. 4a is a diagram of an embodiment of the DSC 20, wherein the digital image I is at the upper-left corner of the display 23. FIG. 4b is a diagram of an embodiment of the DSC 20, wherein the digital image I is at the lower-right corner of the display 23 after the digital image I moves from the upper-left corner to the lower-right corner along the direction A. As shown in the drawings, the processor 22 dynamically displays the digital image I from the upper-left corner to the lower-right corner on the screen D of the display 23 along the direction A, using the table in FIG. 3.

Figure 5A:
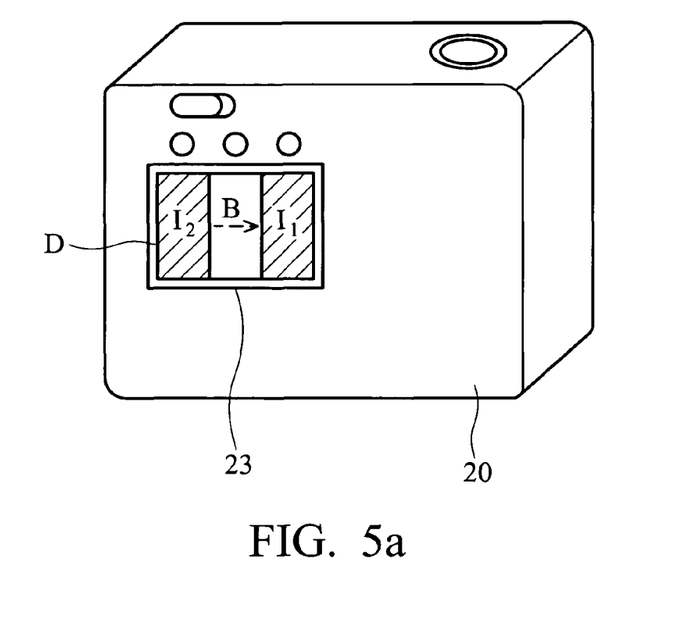
FIG. 5a is a diagram of an embodiment of the DSC 20, wherein digital images $I_1$ and $I_2$ move from left to right along the direction B on the display 23.
Figure 5B:
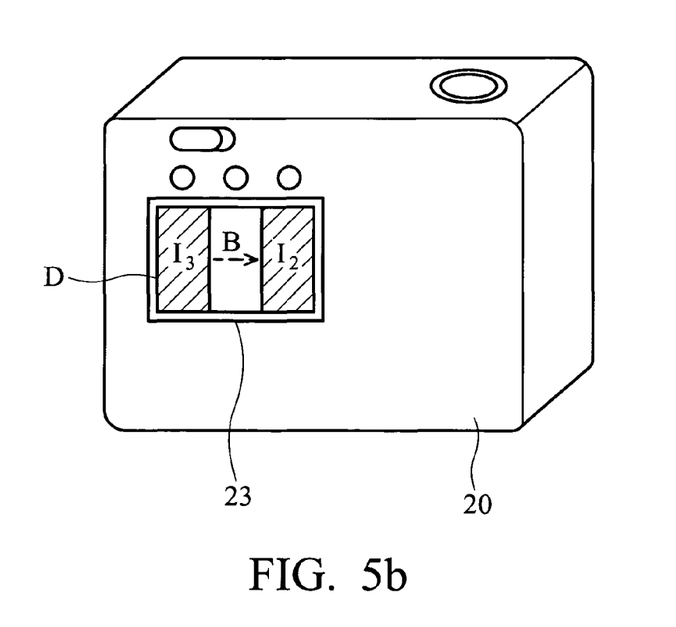
FIG. 5b is a diagram of an embodiment of the DSC 20, wherein digital images $I_2$ and $I_3$ move from left to right along the direction B on the display 23.

Moreover, the processor 22 can dynamically display two or more digital images on the screen D of the display 23 simultaneously, using the table in FIG. 3, thus achieving the effect of switching those digital images. FIG. 5a is a diagram of an embodiment of the DSC 20, wherein digital images $I_1$ and $I_2$ move from left to right along the direction B on the display 23. FIG. 5b is a diagram of an embodiment of the DSC 20, wherein digital images $I_2$ and $I_3$ move from left to right along the direction B on the display 23. Similar to the case in which only one digital image is dynamically displayed on the screen D as previously described, first, the processor 22 projects digital images $I_1$, $I_2$, and $I_3$ stored in the memory 21 on the virtual plane V (as shown in FIG. 2) to form three image regions respectively (not shown in the drawings). Each image region is smaller than the virtual plane V in dimension. In some embodiments, each image region is one-ninth of the virtual plane V in dimension. Referring to FIG. 2, when the image regions and the display region $D_V$ overlap, the processor 22 displays corresponding parts of the digital images $I_1$, $I_2$, and $I_3$ by reading from the memory 21 on corresponding parts of the screen D of the display 23, using the table in FIG. 3, thus achieving the effect of dynamically displaying three digital images $I_1$, $I_2$, and $I_3$ on the screen D of the display 23 sequentially from left to right along the direction B.

Figure 5C:
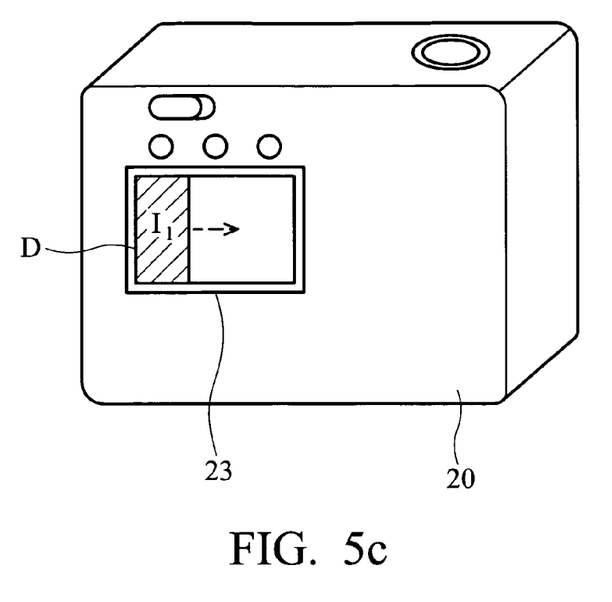
FIG. 5c is a diagram of an embodiment of the DSC 20, wherein the digital image $I_1$ is dynamically displayed on the display 23.
Figure 5D:
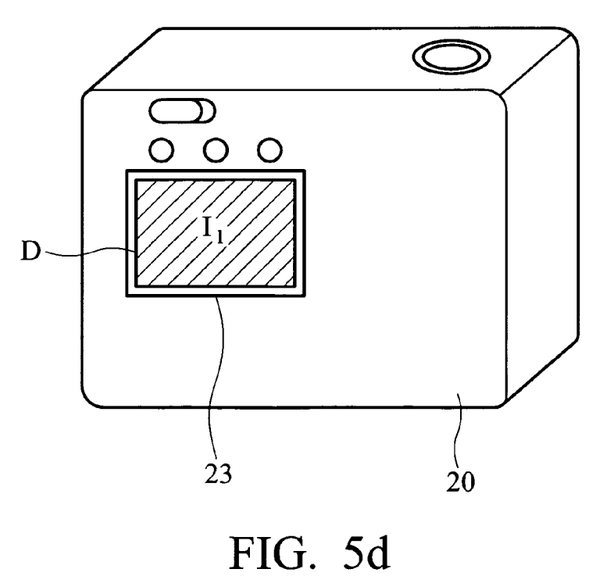
FIG. 5d is a diagram of an embodiment of the DSC 20, wherein the digital image $I_1$ is completely displayed and stays on the display 23.
Figure 5E:
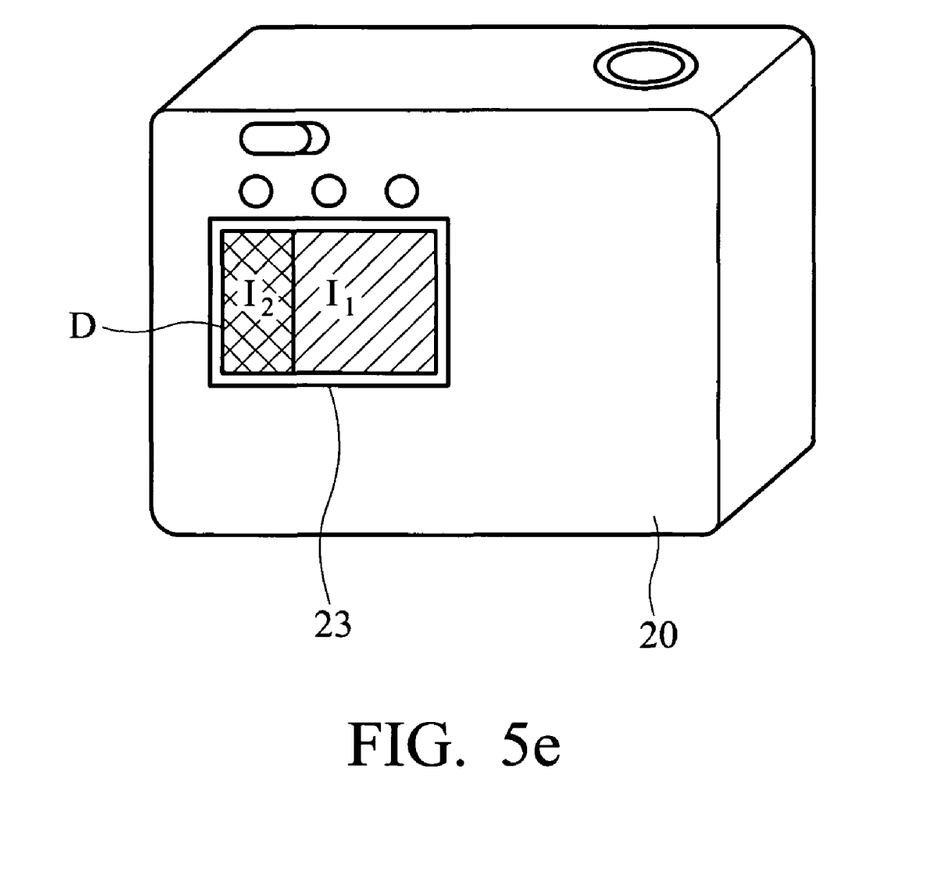
FIG. 5e is a diagram of an embodiment of the DSC 20, wherein digital image $I_1$ is dynamically displayed and partially overridden by another digital image $I_2$ on the display 23.

An example of dynamically displaying two digital images $I_1$ and $I_2$ is described hereinafter. The two digital images $I_1$ and $I_2$ are stored in the memory 21 with the same dimension of 640×480 pixels. The coordinate of the display 23 is shown at the lower-right corner in FIG. 2. The display 23 is 640×480 pixels in dimension. The coordinate of the virtual plane V is shown at the lower-left corner in FIG. 2. The virtual plane V is 1920×1440 pixels in dimension. The virtual plane V is 9 times the display region $D_V$ in dimension. The display region $D_V$ is in the center of the virtual plane V. Each digital image $I_1$, or $I_2$ and the display region $D_V$ are of the same dimension. The display region $D_V$ corresponds to the screen D of the display 23 in a one-to-one pixel style. The processor 22 projects the digital images $I_1$ and $I_2$ in the memory 21 on the virtual plane V to form image regions $I_{V1}$ and $I_{V2}$ and decides moving traces of the image regions $I_{V1}$ and $I_{V2}$ on the virtual plane V respectively. The moving traces of the image regions $I_{V1}$ and $I_{V2}$ can be different. The processor 22 then determines the overlap between each image region $I_{V1}$ or $I_{V2}$ and the display region $D_V$ and displays corresponding parts of the digital images $I_1$ and $I_2$ by reading from the memory 21 on corresponding parts of the screen D of the display 23. The image regions $I_{V1}$ and $I_{V2}$ on the virtual plane V can also overlap. It is noted that when the image regions $I_{V1}$ and $I_{V2}$ overlap, the processor 22 determines one of the image regions $I_{V1}$ and $I_{V2}$ for display. For example, according to generation time or selection sequence of the digital images $I_1$ and $I_2$. Finally, the processor 22 outputs a preset background color, such as white color, to fill a background area G on the screen D that does not display the corresponding parts of the digital images $I_1$ and $I_2$. In some embodiments, the background area G on the screen D corresponds to another digital image previously displayed. For example, the processor 22 dynamically displays the digital image $I_1$ on the screen D, as shown in FIG. 5c. The digital image $I_1$ is then completely displayed and stays on the screen D, as shown in FIG. 5d, so a user can view the full digital image $I_1$. After a period of time, such as 2 or 3 seconds, the processor 22 dynamically displays the digital image $I_2$ on the screen D. The digital image $I_2$ then overrides the digital image $I_1$ partially, as shown in FIG. 5e, thus completing the process of dynamically displaying the digital images $I_1$ and $I_2$ sequentially. Therefore, the background area G on the screen D that does not display the corresponding part of the digital image $I_2$ corresponds to the digital image $I_1$ previously displayed.

As previously described, when executing coordinate conversion, the processor 22 divides the virtual plane V into 9 areas. According to the table in FIG. 3, the overlap between each image region $I_{V1}$, or $I_{V2}$ and the display region $D_V$ exists only when the upper-left point $S_{V1}(S_{VX1},S_{VY1})$ or $S_{V2}(S_{VX2},S_{VY2})$ of the image region $I_{V1}$ or $I_{V2}$ is located at the areas a, b, c, or d. Each overlap is defined by the upper-left point $P_{V1}$ or $P_{V2}$ and the lower-right point $Q_{V1}$ or $Q_{V2}$. After the processor 22 determines the areas on the virtual plane V where the upper-left point $S_{V1}(S_{VX1},S_{VY1})$ and $S_{V2}(S_{VX2},S_{VY2})$ of the image region $I_{V1}$ and $I_{V2}$ are located, the processor 22 calculates out the coordinates of corresponding parts of the digital images $I_1$ and $I_2$ in the memory 21, which are defined by the upper-left points $P_{M1}$, $P_{M2}$ and the lower-right points $Q_{M1}$, $Q_{M2}$ respectively, using the table in FIG. 3. The processor 22 also calculates out the coordinates of corresponding parts of the screen D on the display 23, which are defined by the upper-left points $P_{D1}$, $P_{D2}$ and the lower-right points $Q_{D1}$, $Q_{D2}$ respectively, using the table in FIG. 3. The processor 22 then displays the corresponding parts of the digital images $I_1$ and $I_2$, defined by the two points $P_{M1}$, $P_{M2}$ and $Q_{M1}$, $Q_{M2}$ respectively, by reading from the memory 21 on the corresponding parts of the screen D of the display 23, defined by the two points $P_{D1}$, $P_{D2}$ and $Q_{D1}$, $Q_{D2}$ respectively. Moreover, the table in FIG. 3 also provides a formula for coordinate conversion from an arbitrary point $K_{M1}(K_{MX1},K_{MY1})$ or $K_{M2}(K_{MX2},K_{MY2})$ in the corresponding part of the digital image $I_1$ or $I_2$ in the memory 21 to a corresponding point $K_{D1}$ or $K_{D2}$ on the screen D of the display 23 after projecting the point $K_{M1}$ or $K_{M2}$ on the screen D as the point $K_{D1}$ or $K_{D2}$.

Figure 6:
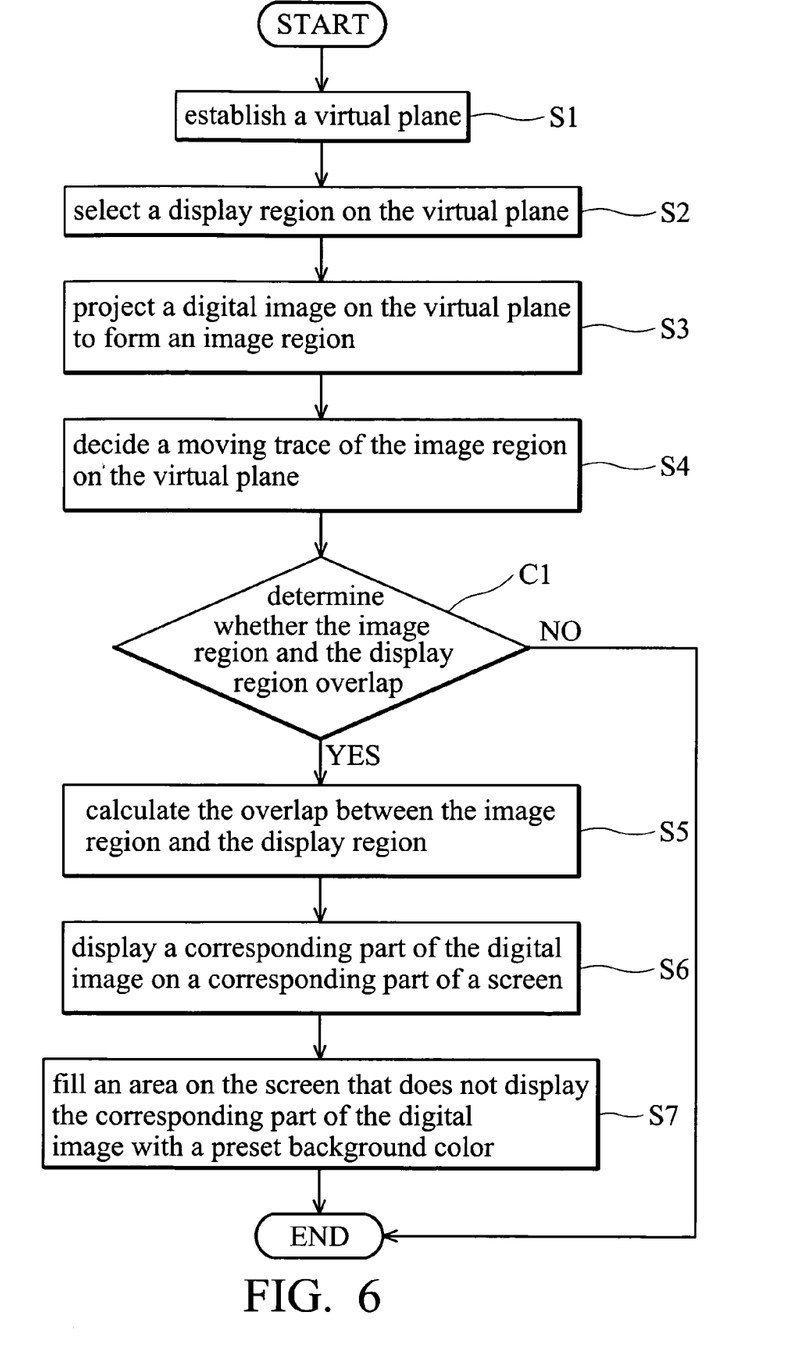
FIG. 6 is a process flowchart of an embodiment of a method of dynamically displaying digital images by coordinate conversion on a virtual plane.

FIG. 6 is a process flowchart of an embodiment of a method of dynamically displaying digital images by coordinate conversion on the virtual plane V. Referring to FIGS. 2 and 6, first, in the step S1, the processor 22 establishes a virtual plane V. In the step S2, the processor 22 selects a display region $D_V$ on the virtual plane V. The display region $D_V$ is in the center of the virtual plane V. The display region $D_V$ corresponds to the screen D of the display 23 in a one-to-one pixel style. In the step S3, the processor 22 projects a digital image I in the memory 21 on the virtual plane V to form an image region $I_V$. In the step S4, the processor 22 decides a moving trace of the image region $I_V$ on the virtual plane V. Then, in the step C1, the processor 22 determines whether the image region $I_V$ and the display region $D_V$ overlap. If not, the process stops. If so, in the step S5, the processor 22 calculates the overlap between the image region $I_V$ and the display region $D_V$. In the step S6, the processor 22 displays a corresponding part of the digital image I by reading from the memory 21 on a corresponding part of the screen D of the display 23. Finally, in the step S7, the processor 22 outputs a preset background color, such as white color, to fill a background area G on the screen D that does not display the corresponding part of the digital image I. Alternatively, the background area G on the screen D corresponds to another digital image previously displayed. Moreover, the processor 22 can dynamically display two or more digital images on the screen D of the display 23 simultaneously, using the method in FIG. 6, thus achieving the effect of switching those digital images.

In some embodiments of the invention, digital images can move on a display of a DSC in any style, for example, from upper-left to lower-right, from left to right, rotational, irregular, or others, using the method and the formula of coordinate conversion on a virtual plane, thus enhancing joy and friendliness in use. In some embodiments of a DSC, a system menu is displayed on a display of the DSC for a user to select. The system menu includes many options for special effects, as shown in FIGS. 2, 5a, and 5b. After the user selects his favorite option for special effects, the DSC dynamically displays digital images on the display according to the process in FIG. 6.

Figure 7:
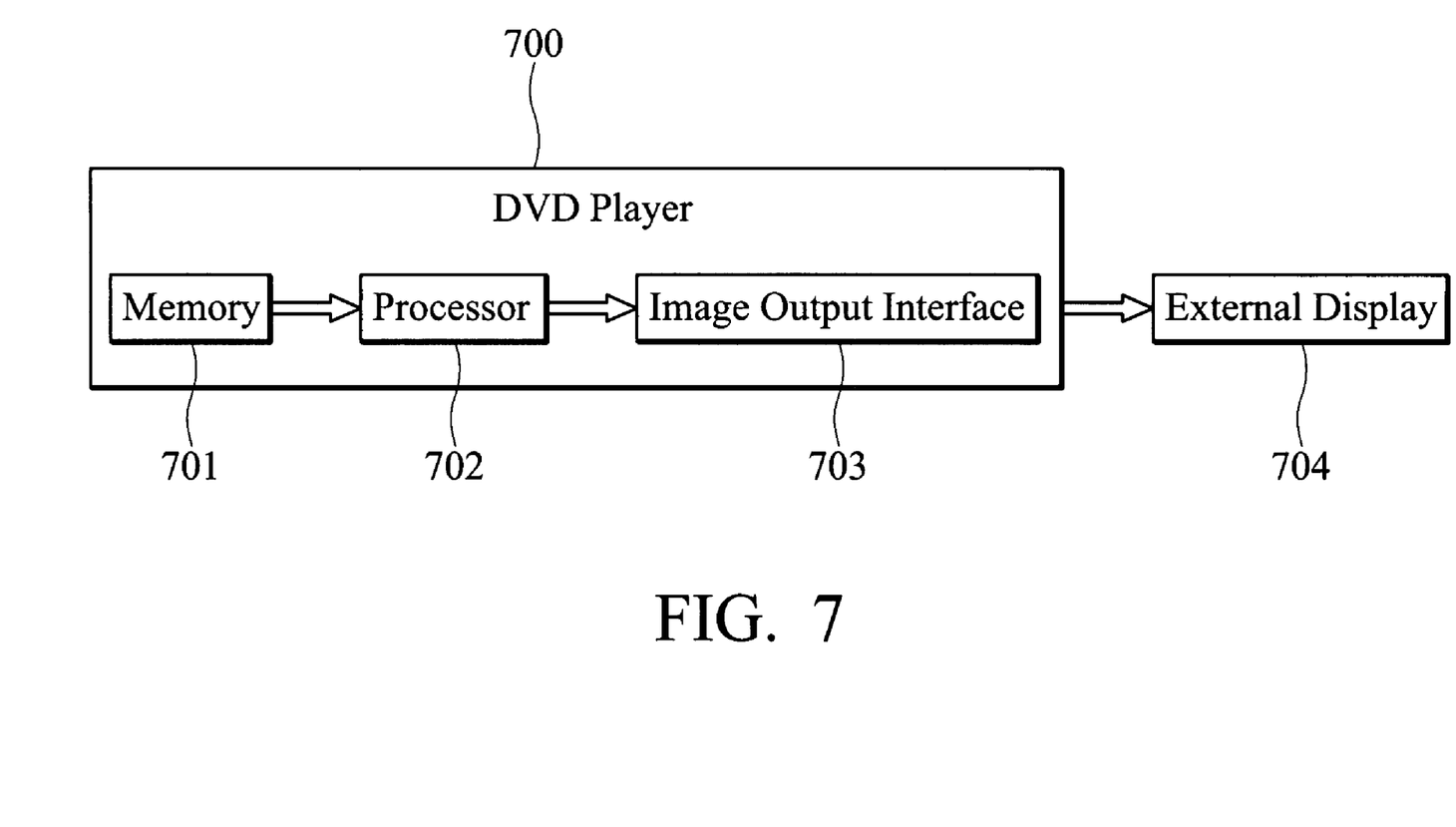
FIG. 7 is a schematic diagram of an embodiment of a digital versatile disc (DVD) player capable of dynamically displaying digital images by coordinate conversion on a virtual plane.

The invention can be also applied in a digital versatile disc (DVD) player. In some embodiments of the invention, a DVD player is capable of dynamically displaying digital images by coordinate conversion on a virtual plane. FIG. 7 is a schematic diagram of an embodiment of a DVD player 700 capable of dynamically displaying digital images by coordinate conversion on a virtual plane. The DVD player 700 includes a memory 701, a processor 702, and an image output interface 703. The memory 701 stores at least a digital image. The image output interface 703 is connected to an external display 704. The processor 702 establishes a virtual plane. The virtual plane includes a display region in the center. The display region and the digital image are of the same dimension. The processor 702 projects the digital image in the memory 701 on the virtual plane to form an image region, decides a moving trace of the image region on the virtual plane, determines whether the image region and the display region overlap, and, if so, outputs a corresponding part of the digital image to the image output interface 703. The execution process is described in detail previously and shown in FIG. 6. The external display 704 includes a screen. The screen corresponds to the display region in a one-to-one pixel style. The external display 704 is connected to the image output interface 703. The corresponding part of the digital image is displayed on a corresponding part of the screen. Finally, the processor 702 outputs a preset background color to fill an area on the screen that does not display the corresponding part of the digital image. Alternatively, the area on the screen that does not display the corresponding part of the digital image corresponds to another digital image previously displayed.

To dynamically display a plurality of digital images on the screen simultaneously, the processor 702 projects the digital images in the memory 701 on the virtual plane to form a plurality of image regions respectively. The processor 702 decides a plurality of moving traces of the image regions on the virtual plane. The processor 702 then determines whether each image region and the display region overlap and, if so, outputs a corresponding part of each digital image to the image output interface 703. The image regions can overlap. When the image regions overlap, the processor 702 determines one of the image regions for display. The digital images are of the same dimension.

The memory 701 can be a synchronous dynamic random access memory (SDRAM). The processor 702 can be a circuit, a digital signal processor (DSP), or others. The image output interface 703 can be a TV encoder, an LCD interface controller, or others. The external display 704 can be a TV, an LCD, or others.

While the invention has been described by way of example and in terms of several embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of dynamically displaying digital images by coordinate conversion on a virtual plane, comprising the steps of:

establishing a virtual plane;

selecting a display region on the virtual plane, wherein the display region is in the center of the virtual plane, and the display region corresponds to a screen of a display unit in a one-to-one pixel style, wherein the virtual plane is N by N times larger than the display region, N is a finite integer;

projecting at least a digital image in a storage unit on the virtual plane to form an image region, wherein the digital image and the display region are of the same dimension;

deciding a moving trace of the image region on the virtual plane;

determining whether the image region and the display region overlap by checking if an upper-left point of the image region is in a special region of the virtual plane;

calculating the overlap between the image region and the display region according to the upper-left point of the image region; and displaying a corresponding part of the digital image on a corresponding part of the screen according to the upper-left point of the image region and filling an area on the screen that does not display the corresponding part of the digital image with a preset background color or with another digital image previously displayed, wherein when the image region moves on the virtual plane from a first position to a second position along the moving trace, the method further calculating first and second overlaps between the image region and the display region respectively and refreshing the display on the screen of the display from a first corresponding part of the digital image corresponding to the first overlap on a first corresponding part of the screen to a second corresponding part of the digital image corresponding to the second overlap on a second corresponding part of the screen.

2. The method as claimed in claim 1 further comprising the step of projecting a plurality of digital images in the storage unit on the virtual plane to form a plurality of image regions respectively, wherein the digital images are of the same dimension.

3. The method as claimed in claim 2, wherein when the image regions overlap, determining one of the image regions for display.

4. The method as claimed in claim 2 further comprising the step of deciding a plurality of moving traces of the image regions on the virtual plane.

5. The method as claimed in claim 1, wherein the virtual plane is 9 times the digital image in dimension.

6. The method as claimed in claim 1, wherein the special region of the virtual plane comprises the display region.

7. The method as claimed in claim 1, wherein:

N is equal to 3;

the corresponding part of the digital image is defined by an upper-left point and a lower-right point;

an origin is located on the upper-left corner of the digital image;

a X-axis extends from the origin in a right direction, and a Y-axis extends from the origin in a down direction; and if the upper-left point of the image region is left and above from the display region, the upper-left point of the digital image has a coordinate equal to (X1,Y1) and the lower-right point of the digital image has a coordinate equal to (X2,Y2) as follows:

$X1 = L - S_{VX}$;

$Y1 = W - S_{VY}$;

$X2 = L$; and $Y2 = W$, wherein:

L represents length of the digital image in the X-axis direction;

W represents width of the digital image in the Y-axis direction;

$S_{VX}$ represents a distance from the upper-left point of the image region to the virtual plane' left; and $S_{VY}$ represents a distance from the upper-left point of the image region to the virtual plane' top.

8. A digital versatile disc (DVD) player capable of dynamically displaying digital images by coordinate conversion on a virtual plane, comprising:

an image output interface connected to a display unit, wherein the display unit comprises a screen, the screen corresponds to the display region in a one-to-one pixel style, the display unit is connected to the image output interface, and the corresponding part of the digital image is displayed on a corresponding part of the screen;

a storage unit storing at least a digital image; and a processing unit, wherein the processing unit establishes a virtual plane comprising a display region in the center, the virtual plane is N by N times larger than the display region, N is a finite integer, the display region and the digital image are of the same dimension, and the processing unit projects the digital image in the storage unit on the virtual plane to form an image region, decides a moving trace of the image region on the virtual plane, determines whether the image region and the display region overlap by checking if an upper-left point of the image region is in a special region of the virtual plane, and, if so, outputs a corresponding part of the digital image to the image output interface according to an upper-left point of the image region and outputs a preset background color or another digital image previously displayed to fill an area on the screen that does not display the corresponding part of the digital image, wherein when the image region moves on the virtual plane from a first position to a second position along the moving trace, the processing unit further calculates first and second overlaps between the image region and the display region respectively and refreshes the display on the screen of the display from a first corresponding part of the digital image corresponding to the first overlap on a first corresponding part of the screen to a second corresponding part of the digital image corresponding to the second overlap on a second corresponding part of the screen.

9. The DVD player as claimed in claim 8, wherein the processing unit projects a plurality of digital images in the storage unit on the virtual plane to form a plurality of image regions respectively, the digital images are of the same dimension, and the processing unit decides a plurality of moving traces of the image regions on the virtual plane.

10. The DVD player as claimed in claim 9, wherein when the image regions overlap, the processing unit determines one of the image regions for display.

11. The DVD player as claimed in claim 8, wherein the virtual plane is 9 times the digital image in dimension.

12. The DVD player as claimed in claim 8, wherein the special region of the virtual plane comprises the display region.

13. The DVD player as claimed in claim 8, wherein:

N is equal to 3;

the corresponding part of the digital image is defined by an upper-left point and a lower-right point;

an origin is located on the upper-left corner of the digital image;

a X-axis extends from the origin in a right direction, and a Y-axis extends from the origin in a down direction; and if the upper-left point of the image region is left and above from the display region, the upper-left point of the digital image has a coordinate equal to (X1,Y1) and the lower-right point of the digital image has a coordinate equal to (X2,Y2) as follows:

$$X1 = L - S_{VX};$$

$$Y1 = W - S_{VY};$$

$$X2 = L; \text{ and}$$

$$Y2 = W, \text{ wherein:}$$

L represents length of the digital image in the X-axis direction;

W represents width of the digital image in the Y-axis direction;

$S_{VX}$ represents a distance from the upper-left point of the image region to the virtual plane' left; and $S_{VY}$ represents a distance from the upper-left point of the image region to the virtual plane' top.

14. A digital still camera (DSC) capable of dynamically displaying digital images by coordinate conversion on a virtual plane, comprising:

a display unit comprising a screen;

an image capture unit generating at least a digital image by capturing an external image;

a storage unit storing the digital image; and a processing unit, wherein the processing unit establishes a virtual plane comprising a display region in the center, the virtual plane is N by N times larger than the display region, N is a finite integer, the display region corresponds to the screen of the display unit in a one-to-one pixel style, the display region and the digital image are of the same dimension, and the processing unit projects the digital image in the storage unit on the virtual plane to form an image region, decides a moving trace of the image region on the virtual plane, determines whether the image region and the display region overlap by checking if an upper-left point of the image region is in a special region of the virtual plane, and, if so, displays a corresponding part of the digital image on a corresponding part of the screen according to an upper-left point of the image region and outputs a preset background color or another digital image previously displayed to fill an area on the screen that does not display the corresponding part of the digital image, wherein when the image region moves on the virtual plane from a first position to a second position along the moving trace, the processing unit further calculates first and second overlaps between the image region and the display region respectively and refreshes the display on the screen of the display from a first corresponding part of the digital image corresponding to the first overlap on a first corresponding part of the screen to a second corresponding part of the digital image corresponding to the second overlap on a second corresponding part of the screen.

15. The DSC as claimed in claim 14, wherein the processing unit projects a plurality of digital images in the storage unit on the virtual plane to form a plurality of image regions respectively, the digital images are of the same dimension, and the processing unit decides a plurality of moving traces of the image regions on the virtual plane.

16. The DSC as claimed in claim 15, wherein when the image regions overlap, the processing unit determines one of the image regions for display.

17. The DSC as claimed in claim 14, wherein the virtual plane is 9 times the digital image in dimension.

18. The DSC as claimed in claim 14, wherein the special region of the virtual plane comprises the display region.

19. The DSC as claimed in claim 14, wherein:

N is equal to 3;

the corresponding part of the digital image is defined by an upper-left point and a lower-right point;

an origin is located on the upper-left corner of the digital image;

a X-axis extends from the origin in a right direction, and a Y-axis extends from the origin in a down direction; and if the upper-left point of the image region is left and above from the display region, the upper-left point of the digital image has a coordinate equal to (X1,Y1) and the lower-right point of the digital image has a coordinate equal to (X2,Y2) as follows:

$X1 = L - S_{VX}$;

$Y1 = W - S_{VY}$;

$X2 = L$; and $Y2 = W$, wherein:

L represents length of the digital image in the X-axis direction;

W represents width of the digital image in the Y-axis direction;

$S_{VX}$ represents a distance from the upper-left point of the image region to the virtual plane' left; and $S_{VY}$ represents a distance from the upper-left point of the image region to the virtual plane' top.

\* \* \* \* \*